United States Patent
Lee et al.

(10) Patent No.: US 10,661,660 B2
(45) Date of Patent: May 26, 2020

(54) VEHICLE, VEHICLE CHARGING DEVICE, VEHICLE CHARGING SYSTEM AND METHOD FOR CHARGING VEHICLE

(71) Applicants: HYUNDAI MOTOR COMPANY, Seoul (KR); KIA MOTORS CORPORATION, Seoul (KR); Research & Business Foundation SUNGKYUNKWAN UNIVERSITY, Suwon-si, Gyeonggi-do (KR)

(72) Inventors: Woo Young Lee, Yongin-si (KR); Byeong Seob Song, Yongin-si (KR); JaeEun Cha, Gwangmyeong-si (KR); Gyu Yeong Choe, Suwon-si (KR); Minjung Kim, Suwon-si (KR); Jongeun Byun, Suwon-si (KR); Minkook Kim, Suwon-si (KR); Dongmyoung Joo, Suwon-si (KR); Sangjoon Ann, Suwon-si (KR); Byoung Kuk Lee, Yongin-si (KR)

(73) Assignees: Hyundai Motor Company, Seoul (KR); Kia Motor Corporation, Seoul (KR); Research & Business Foundation Sungkyunkwan University, Suwon-si, Gyeonggi-do (KR)

( * ) Notice: Subject to any disclaimer, the term of this patent is extended or adjusted under 35 U.S.C. 154(b) by 404 days.

(21) Appl. No.: 15/381,592

(22) Filed: Dec. 16, 2016

(65) Prior Publication Data
US 2018/0141443 A1 May 24, 2018

(30) Foreign Application Priority Data
Nov. 18, 2016 (KR) .................. 10-2016-0153792

(51) Int. Cl.
*B60L 11/18* (2006.01)
*H02J 7/02* (2016.01)
(Continued)

(52) U.S. Cl.
CPC ............. *B60L 11/182* (2013.01); *B60L 53/12* (2019.02); *B60L 53/305* (2019.02); *B60L 53/31* (2019.02);
(Continued)

(58) Field of Classification Search
CPC .......... B60L 53/12; B60L 11/182; H02J 7/025
(Continued)

(56) References Cited

U.S. PATENT DOCUMENTS 9,156,364 B2 10/2015 Miller et al.
2013/0187595 A1 7/2013 Bucher et al.
(Continued)

FOREIGN PATENT DOCUMENTS

JP    H10-322919 A    12/1998
JP    2010-022183 A    1/2010
(Continued)

OTHER PUBLICATIONS

Korean Notice of Allowance dated Mar. 13, 2019 issued in Korean Patent Application No. 10-2016-0153792 (with English translation).

*Primary Examiner* — Richard V Muralidar
(74) *Attorney, Agent, or Firm* — Morgan, Lewis & Bockius LLP

(57) ABSTRACT

A vehicle charging system includes a power transmitter including at least one voltage converter configured to allow a vehicle charging mode to be changed by a plurality of switches and a magnetic field generator configured to generate a magnetic field corresponding to a voltage converted by the voltage converter; and a power receiver including a current inductor configured to allow an electrical signal to be
(Continued)

induced by the magnetic field generated by the magnetic field generator, a rectifier configured to rectify the induced electrical signal and a battery configured to be charged by the electrical signal rectified by the rectifier.

20 Claims, 9 Drawing Sheets

(51) Int. Cl.
| | | |
|---|---|---|
| *H02J 7/00* | (2006.01) | |
| *B60L 53/60* | (2019.01) | |
| *B60L 53/31* | (2019.01) | |
| *B60L 53/30* | (2019.01) | |
| *B60L 53/12* | (2019.01) | |
| *H02J 50/80* | (2016.01) | |
| *H02J 50/90* | (2016.01) | |
| *H02J 7/04* | (2006.01) | |

(52) U.S. Cl.
CPC ............ *B60L 53/60* (2019.02); *H02J 7/0027* (2013.01); *H02J 7/022* (2013.01); *H02J 7/025* (2013.01); *H02J 7/045* (2013.01); *H02J 50/80* (2016.02); *H02J 50/90* (2016.02); *Y02T 10/7005* (2013.01); *Y02T 10/7241* (2013.01)

(58) Field of Classification Search
USPC .......................................................... 320/108
See application file for complete search history.

(56) References Cited

U.S. PATENT DOCUMENTS

| | | | |
|---|---|---|---|
| 2013/0293192 A1* | 11/2013 | Abe ...................... | B60L 11/182 320/108 |
| 2015/0042169 A1* | 2/2015 | Park ...................... | B60L 11/182 307/104 |

FOREIGN PATENT DOCUMENTS

| | | |
|---|---|---|
| JP | 2014-014202 A | 1/2014 |
| JP | 2014-124019 A | 7/2014 |
| KR | 10-2012-0114074 A | 10/2012 |
| KR | 10-1360550 B1 | 2/2014 |
| KR | 10-1504904 B1 | 3/2015 |

\* cited by examiner

FIG. 5

| FIRST SWITCH / SECOND SWITCH | OPEN | CLOSE |
|---|---|---|
| OPEN | NO-OPERATION | OPERATION IN FIRST MODE |
| CLOSE | NO-OPERATION | OPERATION IN SECOND MODE |

VEHICLE, VEHICLE CHARGING DEVICE, VEHICLE CHARGING SYSTEM AND METHOD FOR CHARGING VEHICLE

CROSS-REFERENCE TO RELATED APPLICATION(S)

This application claims the benefit of priority to Korean Patent Application No. 10-2016-0153792, filed on Nov. 18, 2016 in the Korean Intellectual Property Office, the entire disclosure of which is incorporated herein by reference.

TECHNICAL FIELD

Embodiments of the present disclosure relate to a vehicle, a vehicle charging device, a vehicle charging system and a method for charging the vehicle.

BACKGROUND

Vehicle may include a variety of apparatuses configured to transport objects, such as people, animals, plants, or goods, from the departure point to the destination. The vehicle may be capable of transporting the object to the destination while moving in a variety of direction by using one or more wheels installed in the body of the vehicle. The vehicle may include three-wheeled or four-wheeled vehicles, a two-wheeled vehicle such as a motorcycle, construction equipment, a cycle or a train traveling on rails disposed on a line.

A vehicle typically drives on the road or the railroad using power acquired in a way such that thermal energy acquired by burning fossil fuels such as gasoline and diesel using an engine is converted into mechanical energy. However, recently, a vehicle may obtain power using an electric energy that is charged in a battery inside of the vehicle, as opposed to energy from the burning of the fossil fuel. The vehicle acquiring power from the electric energy may be referred to as "Electric vehicle".

The electric vehicle may include an Electric Vehicle (EV) configured to obtain power from an electric energy, a Hybrid Electric Vehicle (HEV) configured to obtain power from both of an electric energy and a thermal energy through the burning of the fossil fuel, and a Plug-in Hybrid Electric Vehicle (PHEV) configured to charge a rechargeable battery that is embedded by receiving an electric energy from the outside while using power from both of an electric energy and a thermal energy through the burning of the fossil fuel and electric energy.

SUMMARY

Therefore, it is an aspect of the present disclosure to provide a vehicle charging device, a vehicle charging system and a method for charging the vehicle that provide or are provided with a wide range of a charging voltage and charging power that is required by a battery when charging the battery of an electric vehicle.

It is another aspect of the present disclosure to provide a vehicle, a vehicle charging device, a vehicle charging system and a method for charging the vehicle that reduce the cost of manufacturing and installing of the vehicle charging system by simplifying a structure related to the charging installed inside of the vehicle and by reducing the number of components related to the charging.

Additional aspects of the present disclosure will be set forth in part in the description which follows and, in part, will be obvious from the description, or may be learned by practice of the present disclosure.

A vehicle charging system may comprise a power transmitter comprising at least one voltage converter configured to allow a vehicle charging mode to be changed by a plurality of switches and a magnetic field generator configured to generate a magnetic field corresponding to a voltage converted by the voltage converter and a power receiver comprising a current inductor configured to allow an electrical signal to be induced by the magnetic field generated by the magnetic field generator, a rectifier configured to rectify the induced electrical signal and a battery configured to be charged by the electrical signal rectified by the rectifier.

The least one voltage converter may be operated in a first vehicle charging mode in which an output voltage is set to be lower than an input voltage when a first switch among the plurality of switches is opened and a second switch among the plurality of switches is closed.

The least one voltage converter may be operated in a second vehicle charging mode in which an output voltage is set to be higher than an input voltage when all of the plurality of switches are closed.

The least one voltage converter may comprise a cascade buck-boost power factor correction converter.

The vehicle charging mode may be determined based on a voltage applied to the battery.

The vehicle charging mode may be determined a relative position between the power transmitter and the power receiver, which is determined based on a voltage applied to the battery.

The power transmitter may generate a magnetic field corresponding to a predetermined voltage and the rectifier outputs an electrical signal in a fixed frequency.

The vehicle charging mode may be determined based on a difference between an estimated coupling coefficient that is estimated based on a predetermined voltage and a voltage charged to the battery, and an expected coupling coefficient.

The power transmitter may comprise a plurality of voltage converters connected in parallel with each other.

The rectifier may output an electrical signal that is rectified according to a charging state of the battery.

The rectifier comprises a bridgeless rectifier.

A vehicle may comprise a current inductor configured to allow an electrical signal to be induced by a magnetic field generated by a vehicle charging device, a rectifier configured to rectify the induced electrical signal and provided with a bridgeless rectifier and a battery configured to be charged by the electrical signal rectified by the rectifier.

The vehicle may further comprise at least one of a voltage measurer configured to measure a voltage charged to the battery; and a communicator configured to communicate with the vehicle charging device and to transmit a voltage of an electrical signal measured by the voltage measurer to the vehicle charging device.

The vehicle may further comprise a processor configured to calculate an estimated coupling coefficient based on a basic voltage being received from the vehicle charging device and corresponding to the magnetic field, and a voltage measured by the voltage measurer.

The processor may determine a target voltage of the vehicle charging device based on the estimated coupling coefficient and a predetermined coupling coefficient, and transmits information about the target voltage to the vehicle charging device.

A vehicle charging device may comprise an input to which an electrical signal is transmitted, a first voltage converter configured to change a voltage of the electrical signal based on a vehicle charging mode changed by a plurality of switches and a magnetic field generator configured to generate a magnetic field corresponding to a voltage converted by the first voltage converter.

The first voltage converter may comprise a cascade buck-boost power factor correction converter.

At least one of a communicator may be configured to receive information about a voltage applied to a battery of a vehicle from the vehicle; and a processor configured to determine a vehicle charging mode based on the information about the voltage.

The processor may calculate an estimated coupling coefficient by using a voltage applied to the battery and a voltage converted by the first voltage converter, and determine the vehicle charging mode based on a difference between the estimated coupling coefficient and an expected coupling coefficient.

The processer may determine whether to open or close each of the plurality of switches according to the vehicle charging mode.

The plurality of switches may comprise a buck switch and a boost switch, wherein the processor determines to open the buck switch and to close the boost switch among the plurality of switches when it is determined that a voltage step-down is needed according to a difference between the estimated coupling coefficient and the expected coupling coefficient.

The plurality of switches may comprise a buck switch and a boost switch, wherein the processor determines to close the buck switch and the boost switch among the plurality of switches when it is determined that a voltage step-up is needed according to a difference between the estimated coupling coefficient and the expected coupling coefficient.

The vehicle may further comprise a second voltage converter connected to the first voltage convert in parallel with each other and configured to change a voltage of the electrical signal based on a vehicle charging mode that is changed by the plurality of switches.

A method for charging vehicle may comprise setting a basic voltage, generating a magnetic field corresponding to the basic voltage by a vehicle charging device, inducing an electrical signal by the magnetic field in a power receiver of a vehicle, calculating an estimated coupling coefficient based on the basic voltage and a voltage of the electrical signal that is induced by the magnetic field, determining a target voltage of the vehicle charging device based on the estimated coupling coefficient and an expected coupling coefficient, generating a magnetic field corresponding to the target voltage by the vehicle charging device, inducing an electrical signal by the magnetic field corresponding to the target voltage in the power receiver of the vehicle and charging a battery of the vehicle by the electrical signal.

BRIEF DESCRIPTION OF THE DRAWINGS

These and/or other aspects of the disclosure will become apparent and more readily appreciated from the following description of embodiments, taken in conjunction with the accompanying drawings of which:

FIG. 5 is a view illustrating a mode selected according to an open and a close of a buck switch and a boost switch.

DETAILED DESCRIPTION

Reference will now be made in detail to embodiments of the present disclosure, examples of which are illustrated in the accompanying drawings.

Hereinafter, a vehicle, a vehicle charging device, a vehicle charging system and a method for charging the vehicle in accordance with one embodiment of the present disclosure will be described with reference to FIGS. 1 to 9.

Figure 1:
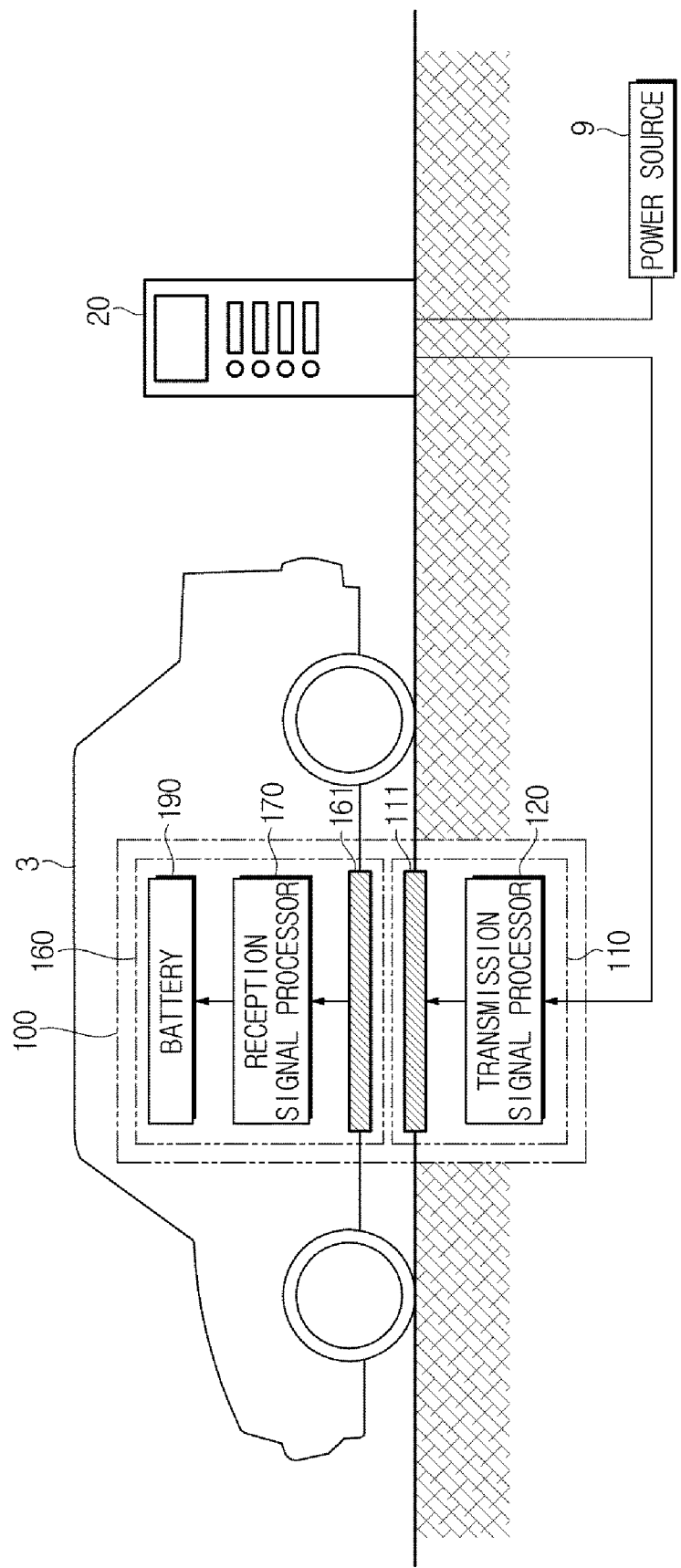
FIG. 1 is a view illustrating a vehicle and a vehicle charging device in accordance with one embodiment of the present disclosure.
Figure 2:
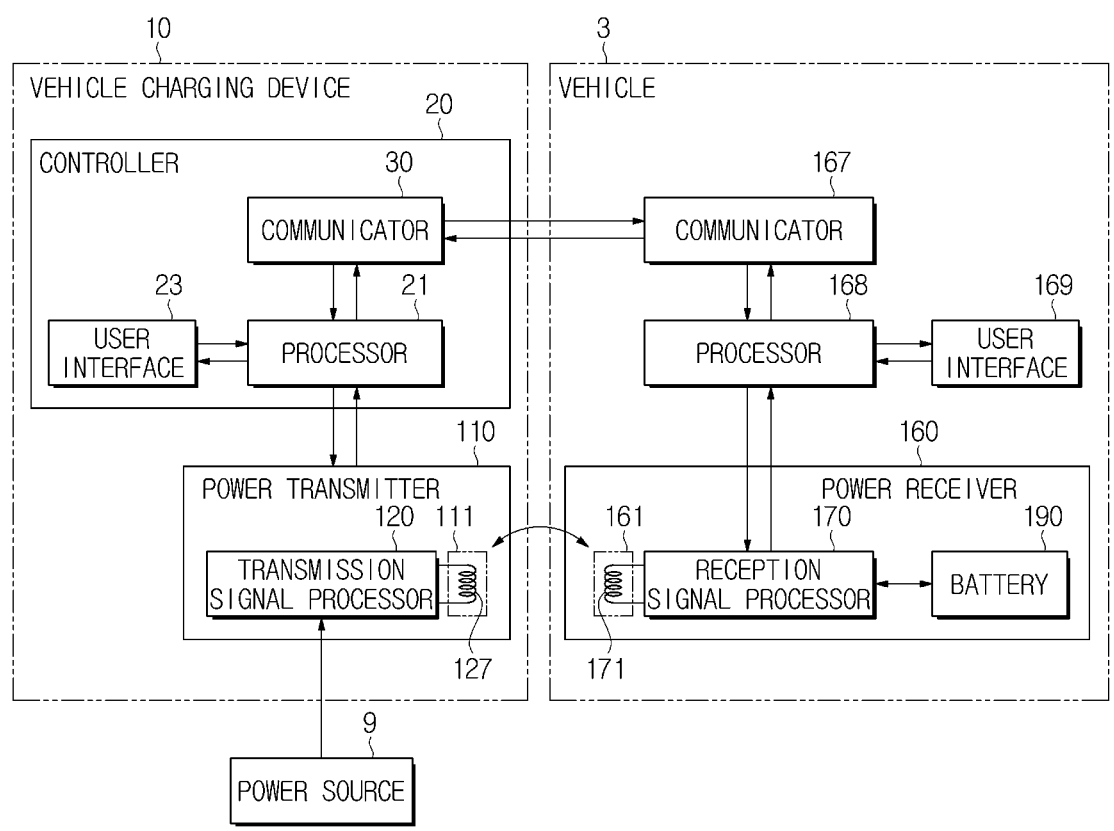
FIG. 2 is a control block diagram illustrating the vehicle and the vehicle charging device in accordance with one embodiment of the present disclosure.

FIG. 1 is a view illustrating a vehicle and a vehicle charging device in accordance with one embodiment of the present disclosure, and FIG. 2 is a control block diagram illustrating the vehicle and the vehicle charging device in accordance with one embodiment of the present disclosure.

Referring to FIGS. 1 and 2, a vehicle 3 may be configured to drive on the road and the rail by using the electric energy and for this, the vehicle 3 may be provided with a motor (not shown) converting the electric energy into power energy and a battery 190 accumulating the electric energy. According to the embodiment, the vehicle 3 may further include an engine (not shown) converting combustion energy of fossil fuels, e.g. gasoline and diesel, into the power energy.

The vehicle 3 may include a four-wheeled vehicle that is conventionally used, and further include a two-wheeled vehicle, a three-wheeled vehicle, construction equipment, a cycle or a train traveling on the rails disposed on the line.

A vehicle charging device 10 may supply the electric energy to the vehicle 3 so that the battery of the vehicle 3 is charged. As illustrated in FIG. 2, the vehicle charging device 10 may include a controller 20 and a vehicle power transmitter 110, and the vehicle charging device 10 may further include various components or equipment required for charging the vehicle 3, e.g., transmission lines or electrical transformers connected to an external power source 9.

The vehicle 3 and the vehicle charging device 10 may be configured to charge the battery 190 of the vehicle 3 via a wireless communication by using a vehicle charging system 100.

The vehicle charging system 100 may include a power transmitter 110 provided in a zone 5 where the vehicle 3 is stopped or parked and a power receiver 160 installed in the vehicle 3. The vehicle charging system 100 may be configured to allow the battery 190 of the vehicle 3 to be charged by inducing the current corresponding to a magnetic field, in the power receiver 160 by the magnetic field generated by the power transmitter 110.

The zone 5 where the vehicle 3 is stopped or parked may include a place in which the vehicle 3 is allowed to be stopped or parked, e.g., an entire or a part of a road and a parking lot.

The power transmitter 110 may include a transmission pad 111 and a transmission signal processor 120 processing an electrical signal input via a magnetic field generator 127 provided in the transmission pad 111.

The transmission pad 111 may be provided in a surface of the zone 5 where the vehicle 3 is stopped or parked, while being approximately horizontal along the surface. In this case, the transmission pad 111 may be exposed to the outside of the surface or embedded in the inside of the surface close to the surface. In addition, the transmission pad 111 may be installed in a variety of positions as well as the surface of the ground, i.e., the transmission pad 111 may be installed on a stand that is installed on the ground while being approximately perpendicular to the ground.

The magnetic field generator 127 for generating a magnetic field corresponding to a voltage of an electrical signal output from the transmission signal processor 120 may be installed in the transmission pad 111. The transmission pad 111 may include a housing formed of a material having an appropriate strength and an appropriate elastic force, e.g. a metal panel or a rubber panel, and configured to prevent the magnetic field generator 127 from being damaged by an external force. The magnetic field generator 127 may be embedded in the inside of the housing of the transmission pad 111 so as to be installed in the transmission pad 111. The housing of the transmission pad 111 may be formed in a certain shape, e.g. a rectangle, square, and circle, in the zone 5 where the vehicle 3 is stopped or parked.

The magnetic field generator 127 may be implemented using at least one coil. At least one coil may form a magnetic field in the surrounding the transmission pad 111 according to a switching direction of the current flowing the at least one coil. The at least one coil provided in the transmission pad 111 may be arranged in at least one linear shape, at least one zigzag shape or at least one spiral shape. When the coil is wound in the spiral shape, the overall shape of the spiral shaped coil may have an approximately circular shape or square shape.

The transmission signal processor 120 may process power supplied from the external power source 9 and then transmit the processed power to the magnetic field generator 127 so that the magnetic field generator 127 generates a magnetic field having a certain size. Particularly, the transmission signal processor 120 may convert an input voltage that is a voltage of the external power source 9 so that a certain voltage (hereinafter referred to as "output voltage") is applied to the magnetic field generator 127. The power source 9 may be an alternating current power source and thus include commercial electrical power.

The transmission signal processor 120 may be connected to the controller 20 to communicate with the controller 20 and thus the transmission signal processor 120 may be operated in response to a variety of control signal transmitted from the controller 20. According to embodiments, the transmission signal processor 120 may be configured to be operated according to a control signal transmitted from the processor 168 installed in the vehicle 3, or alternatively, the transmission signal processor 120 may be configured to be operated according to a control of both of the controller 20 and the processor 168 installed in the vehicle 3.

The transmission signal processor 120 may be implemented using a circuit including various components, e.g. at least one switch, diode or capacitor.

A detailed description of the operation and function of the transmission signal processor 120 will be described later.

The power receiver 160 may include a reception pad 161 provided in the vehicle 3, a reception signal processor 170 processing an electrical signal that is induced by a current inductor 171 provided in the reception pad 161, and the battery 190 being charged by the electrical signal output from the reception signal processor 170.

The reception pad 161 may be disposed on the vehicle 3 by corresponding to a position where the transmission pad 111 is installed, e.g., the surface of the zone 5, so that the current is easily induced according to the magnetic field generated by the transmission pad 111. For example, as illustrated in FIG. 1, the reception pad 161 may be disposed on the bottom surface of the vehicle 3. However, a position of the reception pad 161 is not limited thereto. For example, when the transmission pad 111 is installed on a stand to be approximately perpendicular to the ground, the reception pad 161 may be installed in a rear surface or a side surface of the vehicle by corresponding to the installation type of the transmission pad 111.

In the reception pad 161, the current inductor 171 for inducing an electrical signal having a voltage and a current corresponding to the size of the magnetic field generated by the magnetic field generator 127 may be installed. The reception pad 161 may include a housing formed of a material having an appropriate strength and an appropriate elastic force, e.g. a metal panel or a rubber panel and configured to prevent the current inductor 171 from being damaged by an external force. The current inductor 171 may be embedded in the inside of the housing of the reception pad 161 so as to be installed in the reception pad 161.

The current inductor 171 may include at least one coil, and the at least one coil may be configured to allow the current to be induced according to the change in the magnetic field in the surrounding of the transmission pad 111. The coil of the current inductor 171 may be arranged in at least one linear shape, at least one zigzag shape or at least one spiral shape, as the same as the coil of the transmission pad 111.

The reception signal processor 170 may rectify, step-up or step-down the current induced by the current inductor 171 so that the battery 190 is appropriately charged by the current induced by the current inductor 171. The reception signal processor 170 may be electrically connected to the current inductor 171 and the battery 190 using a circuit or a wire. The reception signal processor 170 may be configured to be operated according to a control of at least one of the processor 168 installed in the vehicle 3 and the controller 20 according to the designer's choice.

A detailed description of operations and functions of the reception signal processor 170 will be described later.

The battery 190 may be installed inside of the vehicle 3 and configured to store the electrical energy and to supply the power to each component of the vehicle 3, e.g. a motor, or a variety of devices inside of the vehicle 3, e.g. an air conditioning device, an instrument panel or the navigation system, as needed. The battery 190 may be charged by the electrical signal output from the reception signal processor 170.

The battery 190 may be implemented using at least one of a lithium-based battery, e.g., a lithium-titanium battery, a lithium-polymer battery, a lithium-ion battery or a lithium-air battery, a lead battery, a nickel-cadmium battery, or a sodium-nickel chloride battery.

The battery 190 may be installed in a variety of positions according to the designer's choice. For example, the battery 190 may be installed in a lower portion of the vehicle 3, in the inside of the bonnet, in a rear side of a back seat or in the inside of the trunk lid. In addition, the battery 190 may be installed in a variety of positions according to the designer's choice.

The controller 20 of the vehicle charging device 10 may be configured to control overall or a part of an operation of the vehicle charging system 100.

As illustrated in FIG. 1, the controller 20 may be installed in the surrounding of the zone 5 where the vehicle 3 is stopped or parked. In this case, the controller 20 may be installed at every zone 5 where the vehicle 3 is stopped or parked. Alternatively, the controller 20 may be installed in a position separated from the zone 5 where the vehicle 3 is stopped or parked.

The controller 20 may be configured to control the power transmitter 110 of the vehicle charging system 100, and in this case, the controller 20 may be configured to control only a single power transmitter 110 or alternatively configured to control a plurality of power transmitters 110.

As illustrated in FIG. 2, the controller 20 of the vehicle charging device 10 may include a processor 21, and as needed, may further include at least one of a user interface 23 and a communicator 30 simultaneously or sequentially.

The processor 21 may perform a variety of signal processing and as needed, perform a variety of determinations to control an overall or a part of the operation of the vehicle charging system 100, and generate a control signal corresponding to the result of the determination.

For example, the processor 21 may set a basic voltage and control the power transmitter 110 so that the power transmitter 110 generates a magnetic field corresponding to the basic voltage.

According to another embodiment, the processor 21 may estimate and acquire an estimated coupling coefficient indicating an arrangement state between the power transmitter 110 and the power receiver 160, using information related to a charging voltage of the battery 190 received via the communicator 30. In this case, the estimated coupling coefficient may be calculated by substituting the base voltage and the charging voltage to a formula that is predetermined according to the designer's choice. For example, the estimated coupling coefficient may be defined as a ratio between a base voltage and a charging voltage.

In addition, the processor 21 may determine strength of a magnetic field that is required to be output from the power transmitter 110 by comparing a coupling coefficient that is estimated (hereinafter referred to as estimated coupling coefficient) with a desired coupling coefficient that is predetermined (hereinafter referred to as expected coupling coefficient). A difference between the estimated coupling coefficient and the expected coupling coefficient may be determined according to a position of the vehicle 3, and in this case, the difference between the estimated coupling coefficient and the expected coupling coefficient may be designed to correspond to a relative position between the power receiver 160 and the power transmitter 110 (or a relative position between the reception pad 161 and the transmission pad 111). For example, the difference between the estimated coupling coefficient and the expected coupling coefficient may be increased as the position of the power receiver 160 (or the position of the reception pad 161) of the vehicle 3 is less matched with the position of the power transmitter 110 (or the position of the transmission pad 111), and otherwise, the difference between the estimated coupling coefficient and the expected coupling coefficient may be reduced as the position of the power receiver 160 (or the position of the reception pad 161) is more matched with the position of the power transmitter 110 (or the position of the transmission pad 111).

In addition, the processor 21 may determine a target output voltage of the transmission signal processor 120 according to the determined strength of the magnetic field, and control the transmission signal processor 120 so that the transmission signal processor 120 converts an input voltage into a target output voltage. For this purpose, the processor 21 may determine a vehicle charging mode corresponding to the target output voltage, generate a control signal according to the determined vehicle charging mode and transmit the control signal to the power transmitter 110. In this case, the control signal may be transmitted to the transmission signal processor 120 of the power transmitter 110. Therefore, the size of the output voltage of the electric power output from the power transmitter 110 may be set to be various according to the determined vehicle charging mode and thus the magnetic field generated in the power transmitter 110 may have a variety of sizes.

In another example, the processor 21 may allow the power source 9 and the power transmitter 110 to be electrically disconnected or connected to each other, and the processor 21 may control an operation of the user interface 23 and the communicator 30.

In addition, the processor 21 may control various operations of the vehicle charging device 10.

The processor 21 may be implemented by using one or more semiconductor chips and associated components, and include central processing unit (CPU) or microcontroller unit (MCU). The CPU or the MCU may perform a processing related to the above mentioned operations based on programs or data embedded therein or input by a user.

The processor 21 may refer to a hardware device including a memory and a processor configured to execute one or more steps interpreted as an algorithm structure. The memory stores algorithm steps, and the processor specifically executes the algorithm steps to perform one or more of the described processes.

Further, the disclosed method may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages.

The user interface 23 may provide a variety of information related to the charging of the vehicle to a user, e.g., a driver of the vehicle 3 or a manager of the vehicle charging device 10 and also the user interface 23 may receive various commands and data related to charging the vehicle from the user. For example, the user interface 23 may receive the output voltage of the transmission signal processor 120, transmit the output voltage to the processor 21, or the user interface 23 may visually or audibly provide the output voltage determined by the processor 21 to the user.

The user interface 23 may include an input means including a physical button, a touch pad, a touch screen, a trackball, a variety of detection sensors and/or a variety of input ports and/or an output means including a display, a speaker and/or a variety of output ports.

The communicator 30 may be configured to communicate with the communicator 167 provided in the vehicle 3. For example, the communicator 30 may receive information about the voltage of the power receiver 160 from the communicator 167 of the vehicle 3, and transmit the received information to the processor 21. In addition, the communicator 30 may allow the processor 168 or the power receiver 160 of the vehicle 3 to be operated according to the control of the processor 21 of the vehicle charging device 10 by transmitting the variety of control signals generated by the processor 21 of the vehicle charging device 10 to the communicator 167.

The communicator 30 may communicate with the communicator 167 of the vehicle 3 using a wired communication network and/or a wireless communication network according to embodiments. The wired communication network may be implemented by using a communication cable, e.g. a pair cable, a coaxial cable, an optical fiber cable or an Ethernet cable. The wireless communication network may be implemented by using a wireless communication technology based on at least one of local area network technology and mobile network technology. The local area network technology may include Wi-Fi, Wi-Fi Direct, zigbee, Bluetooth, Bluetooth Low Energy, and Near Field Communication (NFC). The mobile communication technology may include a variety of wireless communication technology that is implemented by using a variety of mobile communication stands, e.g. 3GPP-based communication system, 3GPP2-based communication system, or Wi MAX-based communication system.

At least one of the user interface 23 and the communicator 30 may be omitted according to the designer's choice.

Referring to FIG. 2, the vehicle 3 may include the communicator 167, the processor 168 and a user interface 169.

The communicator 167 may be configured to communicate with the communicator 30 of the controller 20 based on the wired communication network and/or the wireless communication network. The communicator 167 may receive a control signal generated by the processor 21 of the controller 20 and then transmit the control signal to the processor 168 of the vehicle 3, or transmit information about the charging voltage of the battery 190 to the controller 20.

The processor 168 may generate a control signal for various operations of the vehicle 3 or the various electric components of the vehicle 3 and then control the various operations of the vehicle 3 or the various electric components of the vehicle 3.

According to embodiments, the processor 168 of the vehicle 3 may perform all or part of the operation of the processor 21 of the controller 20. For example, the processor 168 may compare the charging voltage of the battery 190 with the base voltage transmitted via the communicator 167, and acquire an estimated coupling coefficient based on the result of the comparison. In addition, the processor 168 of the vehicle 3 may determine of the strength of the magnetic field that is required to be output from the power transmitter 110, the target output voltage of the transmission signal processor 120 and/or the vehicle charging mode of the power transmitter 110 by comparing the estimated coupling coefficient and the expected coupling coefficient, and allow the result of the determination to be transmitted to the controller 20 via the communicator 167.

The processor 168 of the vehicle 3 may be implemented by using one or more semiconductor chips and associated components and may be installed in an arbitrary position, e.g., a space between the dashboard and the engine room, according to the designer's choice.

The user interface 169 may provide a variety of information related to the operation of the vehicle 3 to a passenger, or receive various commands and data from the passenger of the vehicle 3. For example, the user interface 169 may provide information about whether to perform charging, the estimated coupling coefficient, or information about the strength of the magnetic field generated by the power transmitter 110, in a visual or auditory manner.

The user interface 169 may include an input including a physical button, a touch pad, a touch screen, a trackball, a variety of detection sensors and or a variety of input ports and or an output including a display, a speaker and/or a variety of output ports. The input and the output may be installed in a variety of positions as well as the dashboard, the center fascia, the steering wheel, and the instrument panel. The user interface 169 may be implemented by using the navigation system installed in the vehicle 3.

At least one of the communicator 167, the processor 168, and the user interface 169 may be omitted depending on the designer's choice.

Hereinafter the power transmitter will be described in details with reference to FIGS. 3 to 6.

Figure 3:
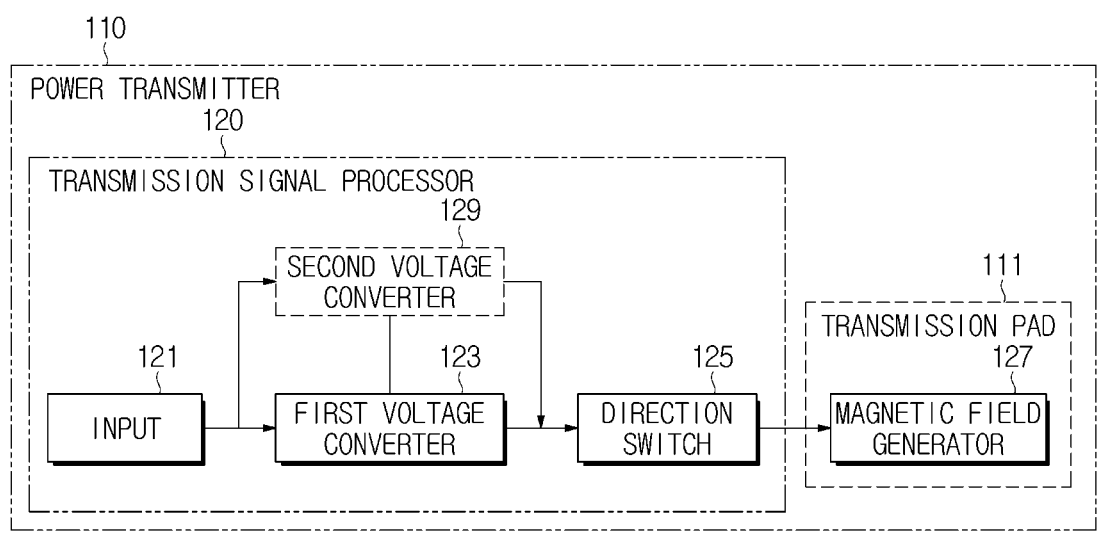
FIG. 3 is a block diagram illustrating the power transmitter of the vehicle charging system in accordance with one embodiment.
Figure 4:
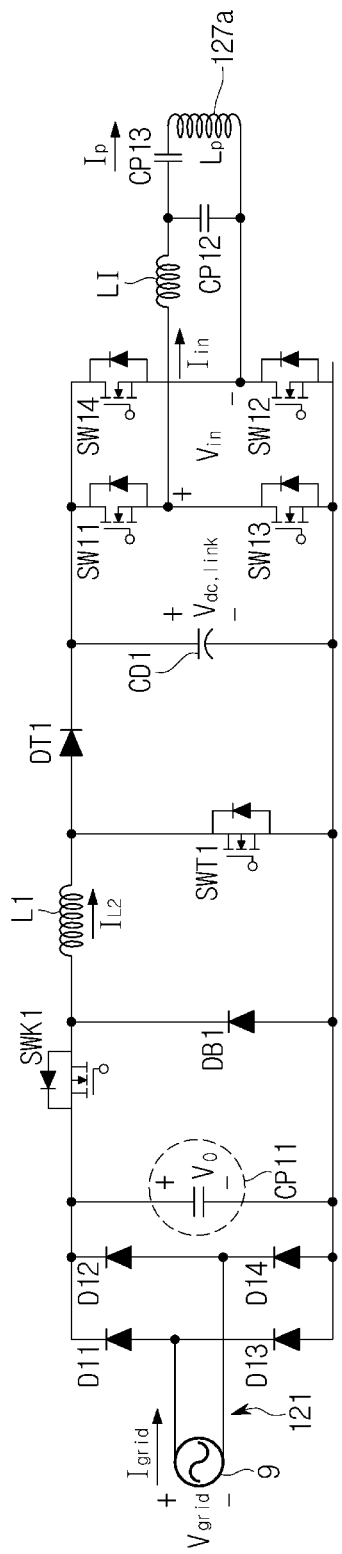
FIG. 4 is a circuit diagram illustrating the power transmitter of the vehicle charging system in accordance with one embodiment.

FIG. 3 is a block diagram illustrating the power transmitter of the vehicle charging system in accordance with one embodiment, and FIG. 4 is a circuit diagram illustrating the power transmitter of the vehicle charging system in accordance with one embodiment.

According to one embodiment, the power transmitter 110 may include the transmission signal processor 120 converting the input voltage into a certain output voltage and the magnetic field generator 127 generating a magnetic field according to the output voltage of the transmission signal processor 120 and installed in the transmission pad 111, as illustrated in FIGS. 3 and 4.

The transmission signal processor 120 may include an input 121 to which the current supplied from the power source 9 is input, at least one voltage converter 123 and 129 converting an input voltage, and a direction switch 125 switching a direction of the current.

The input 121 may receive the current (Igrid) supplied from the power source 9 and transmit the current to a first voltage converter 123.

The first voltage converter 123 may convert an input voltage (Vgrid) of the power source 9 according to a selected vehicle charging mode to allow an output voltage (Vin) to be applied to a coil 127a of the magnetic field generator 127.

The first voltage converter 123 may rectify the alternating current input through the input 121 and in order to rectify the alternating current input, the first voltage converter 123 may include a bridge rectifier using a plurality of diodes, e.g. four diodes (D11 to D14) that is provided in an input terminal thereof.

The first voltage converter 123 may be implemented by using a cascade buck-boost power factor correction converter. The cascade buck-boost power factor correction converter is implemented such that a buck convertor and a boost converter are combined as a single converter.

The buck converter is the type of converter configured to convert an input voltage into an output voltage so that the output voltage is the same as or smaller than the input voltage. The buck converter may be implemented by using a circuit including a first capacitor (CP11), a first buck switch (SWK1), a first buck diode (DB1), a first inductor (L1) and a load, e.g., the coil 127a, as illustrated in FIG. 4.

The boost converter is the type of converter configured to convert an input voltage into an output voltage so that the output voltage is the same as or larger than the input voltage. The buck converter may be implemented by using a circuit including the first capacitor (CP11), a first boost switch (SWT1), a first boost diode (DT1) and the load, e.g., the coil 127a, as illustrated in FIG. 4.

As mentioned above, the cascade buck-boost power factor correction converter is implemented by combining the buck converter to the boost converter. By switching the vehicle charging mode according to an operation of the first buck switch (SWK1) and the first boost switch (SWT1), the cascade buck-boost power factor correction converter may change an input voltage into various output voltages.

FIG. 5 is a view illustrating a mode selected according to an open and a close of a buck switch and a boost switch. In FIG. 5, a first switch represents the buck switch and a second switch represents the boost switch.

Referring to FIG. 5, when the first buck switch (SWK1) and the boost switch (SWT1) are opened, the current may not flow in the cascade buck-boost power factor correction converter and thus a voltage conversion operation may be not performed.

When the first buck switch (SWK1) is opened and the boost switch (SWT1) is closed, the current may not flow in the circuit and thus the cascade buck-boost power factor correction converter may not perform the voltage conversion operation the same as the case in which both of the first buck switch (SWK1) and the boost switch (SWT1) are opened.

When the first buck switch (SWK1) is closed and the boost switch (SWT1) is opened, the cascade buck-boost power factor correction converter may be operated in a first vehicle charging mode. In the first vehicle charging mode, the current in the circuit may flow through the first buck switch (SWK1), the first buck diode (DB1), the first inductor (L1) and the coil 127a, and the cascade buck-boost power factor correction converter may be operated the same or similar to the buck converter. Accordingly, an output voltage (Vin) that is the same as or relatively lower than the input voltage (Vgrid) may be applied to the coil 127a.

When the first buck switch (SWK1) and the boost switch (SWT1) are closed, the cascade buck-boost power factor correction converter may be operated in a second vehicle charging mode. In the second vehicle charging mode, the cascade buck-boost power factor correction converter may perform a voltage step-up operation by being operated the same or similar to the boost converter. Accordingly, an output voltage (Vin) that is the same as or relatively higher than the input voltage (Vgrid) may be applied to the coil 127a.

The buck switch (SWK1) and the boost switch (SWT1) may be opened or closed according to the control of the processor 21 and 168.

For example, when the processor 21 of the controller 20 determines that the power transmitter 110 is needed to generate a magnetic field having a greater strength, according to the difference between the estimated coupling coefficient and the expected coupling coefficient, the processor 21 of the controller 20 may allow the cascade buck-boost power factor correction converter to be operated in the second vehicle charging mode by closing both of the buck switch (SWK1) and the boost switch (SWT1). In this case, the relatively larger voltage (Vin) may be applied to the coil 127a and thus the coil 127a may generate the magnetic field having a greater strength.

Otherwise, when the processor 21 of the controller 20 determines that the power transmitter 110 is needed to generate a magnetic field having a less strength, according to the difference between the estimated coupling coefficient and the expected coupling coefficient, the processor 21 of the controller 20 may allow the cascade buck-boost power factor correction converter to be operated in the first vehicle charging mode by opening the boost switch (SWT1) and by closing the buck switch (SWK1). In this case, a relatively lower voltage (Vin) may be applied to the coil 127a and the coil 127a may generate the magnetic field having a relatively less strength.

Figure 6:
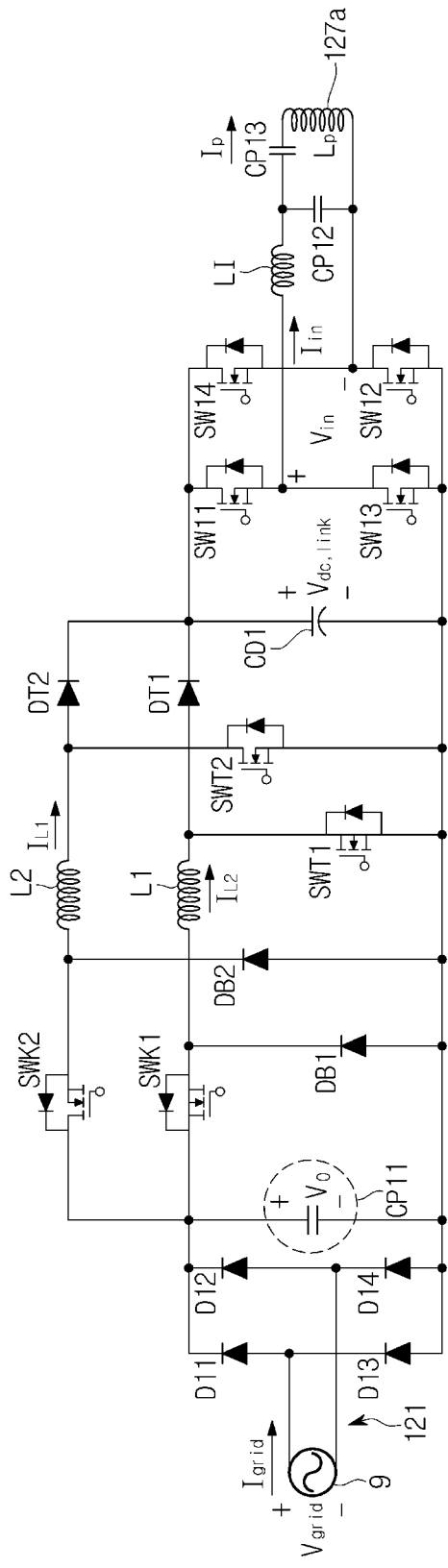
FIG. 6 is a circuit diagram illustrating a power transmitter of a vehicle charging system in accordance with another embodiment.

FIG. 6 is a circuit diagram illustrating a power transmitter of a vehicle charging system in accordance with another embodiment.

As illustrated in FIG. 3, the transmission signal processor 120 may further include a second voltage converter 129. Alternatively, the second voltage converter 129 may be omitted.

As illustrated in FIG. 6, the second voltage converter 129 may be implemented by using the cascade buck-boost power factor correction converter the same as the first voltage converter 123. In other words, as illustrated in FIG. 3, the second voltage converter 129 may be implemented by combining the buck converter that is implemented by a circuit including the first capacitor (CP11), a second buck switch (SWK2), a second buck diode (DB2), a second inductor (L2) and the load, e.g., the coil 127a, and the boost converter that is implemented by a circuit including the first capacitor (CP11), a second boost switch (SWT2), a second boost diode (DT2), a second inductor (L2) and the load, e.g., the coil 127a.

According to one embodiment, the second voltage converter 129 may be connected in parallel with the first voltage converter 123, as illustrated in FIG. 6. According to the open and close of switches (SWK1, SWK2, SWT1, and SWT2), the transmission signal processor 120 may be operated the same as or similar to a circuit in which two buck converters are connected in parallel with each other, or a circuit in which two boost converters are connected in parallel with each other.

In the same manner as the first voltage converter 123, the second voltage converter 129 may be operated in one of the first vehicle charging mode and the second vehicle charging mode according to the open and close of the second buck switch (SWK2), and the second boost switch (SWT2). Accordingly, the second voltage converter 129 may perform the voltage conversion operation so that the output voltage (Vin) is to be lower and higher than the input voltage (Vgrid).

As mentioned above, when the transmission signal processor 120 includes the first voltage converter 123 and the second voltage converter 129, ripple of the current flowing in the circuit may be reduced.

The direction switch 125 may switch a direction of the current flowing in the coil 127a of the magnetic field generator 127. The direction switch 125 may be implemented by a bridge circuit including a plurality of direction conversion switches (SW11 to SW14). Among the plurality of direction conversion switches (SW11 to SW14), a first direction conversion switch (SW1) may be operated in conjunction with a fourth direction conversion switch (SW4) and a second direction conversion switch (SW2) may be operated in conjunction with a third direction conversion switch (SW3). When the first direction conversion switch (SW1) and the fourth direction conversion switch (SW4) are opened, the second direction conversion switch (SW2) and the third direction conversion switch (SW3) may be closed, and when the first direction conversion switch (SW1) and the fourth direction conversion switch (SW4) are closed, the second direction conversion switch (SW2) and the third direction conversion switch (SW3) may be opened. The open and close of the first direction conversion switch (SW1) and the fourth direction conversion switch (SW4) or the open and close of the second direction conversion switch (SW2) and the third direction conversion switch (SW3) may be repeatedly performed according to a certain frequency. The current that flows in the circuit according to the operation of the direction conversion switches (SW11 to SW14) may be alternately input in opposite directions of the coil 127a, and thus the current may flow in the coil 127a while changing the direction thereof according to the certain frequency. Accordingly, the magnetic field having a strength corresponding to the output voltage (Vin) may be formed in the coil 127a.

According to embodiments, as illustrated in FIGS. 4 to 6, the inductor (LI) and at least one capacitor (CP12 and CP13) may be further installed in series and/or parallel with each other between the direction switch 125 and the coil 127a.

Hereinafter the power receiver will be described in details with reference to FIGS. 7 and 8.

Figure 7:
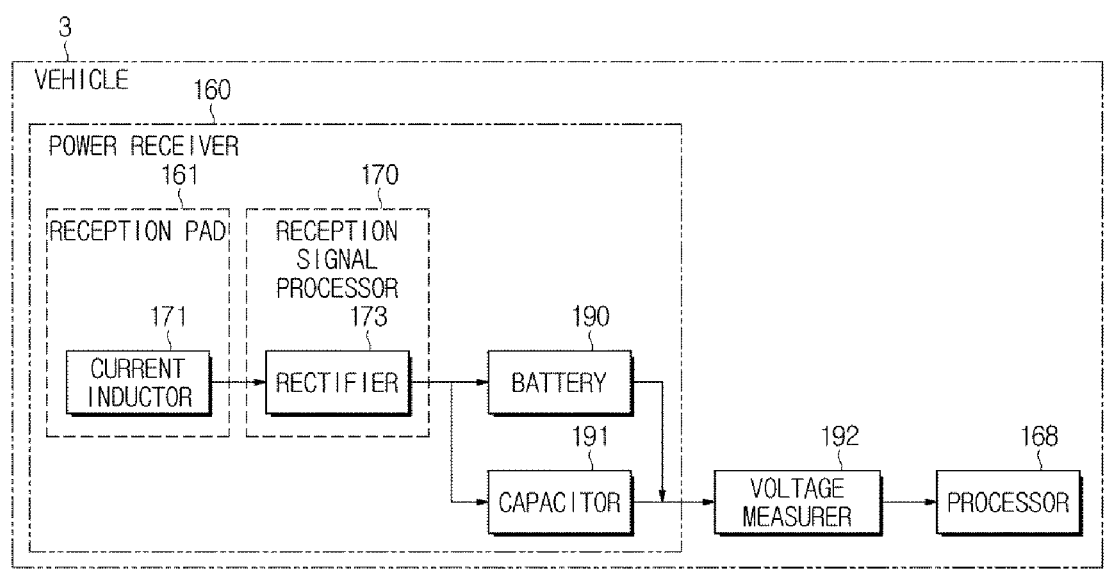
FIG. 7 is block diagram illustrating the power receiver of the vehicle charging system in accordance with one embodiment.
Figure 8:
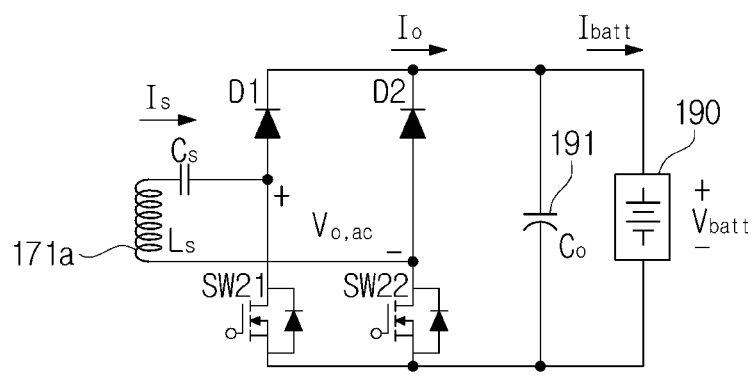
FIG. 8 is circuit diagram illustrating the power receiver of the vehicle charging system in accordance with one embodiment.

FIG. 7 is block diagram illustrating the power receiver of the vehicle charging system in accordance with one embodiment, and FIG. 8 is circuit diagram illustrating the power receiver of the vehicle charging system in accordance with one embodiment.

As illustrated in FIGS. 7 and 8, the power receiver 160 installed in the vehicle 3 may include the current inductor 171 installed in the reception pad 161, the reception signal processor 170 configured to perform a variety of operation related to the current (Is) induced in the current inductor 171, and the battery 190 configured to be charged by the current (Io) output from the reception signal processor 170.

The current inductor 171 may include at least one coil 171a, and the alternating current (Is) may flow in the at least one coil 171a according to the change in the magnetic field generated by the magnetic field generator 127 of the power transmitter 110. The current (Is) included in the at least one coil 171a may be transmitted to the reception signal processor 170.

According to one embodiment, the reception signal processor 170 may include the rectifier 173 to rectify the induced current (Is). In this case, the rectifier 173 may be implemented by using a bridgeless rectifier including a plurality of diodes (D1 and D2) and a plurality of switches (SW21 and SW22). The plurality of diodes (D1 and D2) and the plurality of switches (SW21 and SW22) may be arranged similar to the bridge circuit except that the plurality of diodes (D1 and D2) is connected to an output terminal of the coil 171a and the plurality of switches (SW21 and SW22) is connected to an input terminal of the coil 171a.

The plurality of switches (SW21 and SW22) may be alternately opened or closed with each other. In this case, the plurality of switches (SW21 and SW22) may be opened or closed according to a fixed frequency.

Depending on the open and close of the plurality of switches (SW21 and SW22), the alternating current (Is) induced in the at least one coil 171a may or may not flow to a first diode (D1) or a second diode (D2).

For example, when a first switch (SW21) is opened and a second switch (SW22) is closed, the alternating current (Is) induced in the at least one coil 171a may be transmitted to the battery 190 via only a path ($I_0$, and Ibatt) passing by the first diode (D1), and otherwise, when the first switch (SW21) is closed and the second switch (SW22) is opened, the alternating current (Is) induced in the at least one coil 171a may be transmitted to the battery 190 via only a path passing by the second diode (D2).

Since the output direction of the alternating current (Is) induced in the at least one coil 171a is alternately changed according to the time, the switches (SW21 and SW22) may be opened or closed depending on the output direction of the alternating current (Is) to allow the alternating current (Is) induced in the at least one coil 171a to be transmitted to the battery 190. Otherwise, as needed, the switches (SW21 and SW22) may be opened or closed in opposite to the output direction of the alternating current (Is), and thus the alternating current (Is) induced in the at least one coil 171a may be not transmitted to the battery 190.

As mentioned above, the operation of the switches (SW21 and SW22) may be configured to be performed according to a charging state of the battery 190, and when the operation of the switches (SW21 and SW22) is configured to be performed according to the charging state, the rectifier 173 may output the rectified current according to the charging state of the battery 190.

The current (Io) output from the rectifier 173 may be transmitted to the battery 190 and then the battery 190 may be charged by the transmitted current (Ibatt). The charging voltage of the battery 190 may correspond to the voltage (Vbatt) corresponding to an induced electromotive force of the coil 171a.

When the power receiver 160 of the vehicle 3 is implemented as the above mentioned, the power receiver 160 may have a relatively simple structure and thus the charging structure of the vehicle 3 that is configured to acquire power from an electrical energy may be also simplified. Accordingly, it may be possible to reduce the design and manufacturing cost of the vehicle 3.

According to embodiments, the power receiver 160 may further include a capacitor 191 connected in parallel with the battery 190, as illustrated in FIGS. 7 and 8. Since the capacitor 191 is connected in parallel with the battery 190, the capacitor 191 may have a voltage the same as or similar to the charging voltage (Vbatt) of the battery 190.

According to one embodiment, the vehicle 3 may further include a voltage measurer 192 for measuring the size of the at least one voltage of the battery 190 and the capacitor 191. The voltage measurer 192 may be implemented using a variety of means to measure the direct current (DC) voltage or the alternating current (AC) voltage.

The voltage measurer 192 may output a result of the measurement in the form of electrical signal. The result of the measurement, i.e. the charging voltage of the battery 190 measured by the voltage measurer 192, may be transmitted to the processor 168 provided in the vehicle 3. The processor 168 may acquire an estimated coupling coefficient by using the charging voltage and the basic voltage of the battery 190. In addition, the processor 168 may allow the result of the measurement to be the controller 20 via the communicator 167 of the vehicle 3.

According to embodiment, the result of the measurement may be directly transmitted to the processor 21 of the controller 20 via the communicator 167 of the vehicle 3 and the communicator 30 of the controller 20, and the processor 21 of the controller 20 may acquire an estimated coupling coefficient based on the result of the measurement.

Hereinafter a method for charging vehicle will be described according to one embodiment and with reference to FIG. 9.

Figure 9:
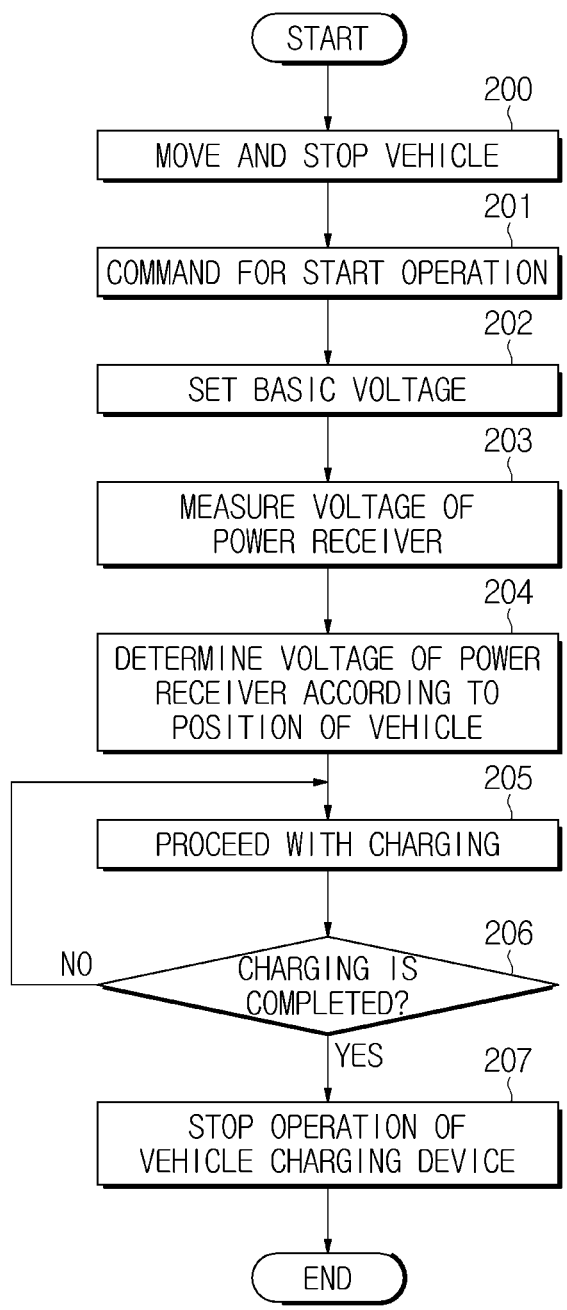
FIG. 9 is a flowchart illustrating a method for charging vehicle in accordance with one embodiment.

FIG. 9 is a flowchart illustrating a method for charging vehicle in accordance with one embodiment.

According to one embodiment of the method for charging vehicle as illustrated in FIG. 9, the vehicle 3 may be moved to the zone 5 capable of wireless charging the vehicle 3 and then the vehicle 3 may be stopped or parked in the zone 5 (200).

Whether the vehicle 3 is stopped or parked may be determined by using a detection means, e.g. a weight sensor or an infrared sensor, configured to detect whether the vehicle 3 is stopped or parked. When it is determined that the vehicle 3 is stopped or parked based on the result of the determination, an operation of the vehicle charging system 100 may be started in response to a control signal generated by the processor 21 of the controller 20 and/or the processor 168 of the vehicle 3, e.g. an electrical signal corresponding to an operation start command (201).

The processor 21 of the controller 20 and/or the processor 168 of the vehicle 3 may set a basic voltage, and by opening or closing the each switch (SWK1, SWK2, SWT1, and SWT2) according to the basic voltage, the vehicle charging mode of the transmission signal processor 120 may be determined (202). In this case, the transmission signal processor 120 may include at least one voltage converter 123, and the voltage converter 123 may include the cascade buck-boost power factor correction converter. The cascade buck-boost power factor correction converter may allow the output voltage to be higher or lower than the input voltage depending on whether to open and close of the switch (SWK1, SWK2, SWT1, and SWT2).

According to the output voltage of the transmission signal processor 120 corresponding to the vehicle charging mode, i.e. the first vehicle charging mode and the second vehicle charging mode, a magnetic field having a certain strength may be generated in the magnetic field generator 127, and the current may be induced in the current inductor 171 of the power receiver 160 according to the generated magnetic field. Accordingly, the battery 190 may be charged by the induced current. During the charging of the battery 190, the voltage measurer 192 of the vehicle 3 may measure the charging voltage of the battery 190 (203).

The processor 21 of the controller 20 and/or the processor 168 of the vehicle 3 may calculate an estimated coupling coefficient by using the measured charging voltage and basic voltage of the battery 190, determine a position of the vehicle 3 by comparing the estimated coupling coefficient with an expected coupling coefficient, and determine a target voltage of the power transmitter 110 so that the vehicle 3 is appropriately charged according to the determined position thereof.

When the target voltage is determined, the processor 21 of the controller 20 and/or the processor 168 of the vehicle 3 may determine a vehicle charging mode corresponding to the target voltage, and allow the each switch (SWK1, SWK2, SWT1, and SWT2) of the transmission signal processor 120 to be opened or closed according to the determined vehicle charging mode, thereby changing the strength of the magnetic field generated in the magnetic field generator 127 (204).

The current may be induced in the power receiver 160 by corresponding to the changed strength of the magnetic field, and the battery 190 may be charged by the induced current (205).

The processor 21 of the controller 20 and/or the processor 168 of the vehicle 3 may determine whether charging the battery 190 is competed or not (206) and when it is determined that charging the battery 190 is competed (YES of 206), the processor 21 of the controller 20 and/or the processor 168 of the vehicle 3 may control the vehicle charging device 10 so that the charging of the vehicle 3 is stopped (207).

As is apparent from the above description, according to the proposed vehicle, vehicle charging device, vehicle charging system and method for charging the vehicle, it may be possible to provide a wide range of the charging voltage and the charging power that is required by the battery of the electric vehicle and thus it may be possible to increase the efficiency of the charging battery of the electronic vehicle.

According to the proposed vehicle, vehicle charging device, vehicle charging system and method for charging the vehicle, since the structure associated with the charging that is installed in the vehicle is simplified and the number of the component related to the charging is reduced, it may be possible to reduce the cost of the manufacture and the installation of the vehicle charging system and to reduce the production cost of the electric vehicle.

According to the proposed vehicle, vehicle charging device, vehicle charging system and method for charging the vehicle, it may be possible to reduce the weight of the power receiver mounted in the vehicle and thus the weight of the vehicle may be also relatively reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle charging system, comprising:
    a power transmitter comprising at least one voltage converter configured to allow a vehicle charging mode to be changed by a plurality of switches, a magnetic field generator configured to generate a magnetic field corresponding to a voltage converted by the at least one voltage converter, and a direction switch configured to switch a direction of a current flowing in a coil of the magnetic field generator so as to form the magnetic field having an intensity corresponding to a magnitude of the converted voltage in the magnetic field generator; and
    a power receiver comprising a current inductor configured to allow an electrical signal to be induced by the magnetic field generated by the magnetic field generator, a rectifier configured to rectify the induced electrical signal, and a battery configured to be charged by the electrical signal rectified by the rectifier,
    wherein the at least one voltage converter comprises a cascade buck-boost power factor correction converter.

2. The vehicle charging system of claim 1, wherein the at least one voltage converter is operated in a first vehicle charging mode in which an output voltage is set to be lower than an input voltage when a first switch among the plurality of switches is opened and a second switch among the plurality of switches is closed.

3. The vehicle charging system of claim 1, wherein the at least one voltage converter is operated in a second vehicle charging mode in which an output voltage is set to be higher than an input voltage when all of the plurality of switches are closed.

4. The vehicle charging system of claim 1, wherein the vehicle charging mode is determined according to a voltage applied to the battery.

5. The vehicle charging system of claim 4, wherein the vehicle charging mode is determined according to a relative position between the power transmitter and the power receiver, in addition to the voltage applied to the battery.

6. The vehicle charging system of claim 4, wherein the power transmitter generates a magnetic field corresponding to a predetermined voltage and the rectifier outputs an electrical signal in a fixed frequency.

7. The vehicle charging system of claim 6, wherein
the vehicle charging mode is determined according to a difference between an estimated coupling coefficient that is estimated based on a predetermined voltage and the voltage applied to the battery, and a predetermined expected coupling coefficient.

8. The vehicle charging system of claim 1, wherein
the power transmitter comprises a plurality of voltage converters connected in parallel with each other.

9. The vehicle charging system of claim 1, wherein
the rectifier outputs an electrical signal that is rectified according to a charging state of the battery.

10. The vehicle charging system of claim 1, wherein
the rectifier comprises a bridgeless rectifier.

11. The vehicle charging system of claim 1, further comprising:
at least one voltage measurer configured to measure a voltage charged to the battery; and a communicator configured to communicate with a vehicle charging device and to transmit a voltage of an electrical signal measured by the voltage measurer to the vehicle charging device.

12. The vehicle charging system of claim 11, further comprising:
a processor configured to calculate an estimated coupling coefficient based on a basic voltage being received from the vehicle charging device and corresponding to the magnetic field, and a voltage measured by the voltage measurer.

13. The vehicle charging system of claim 12, wherein
the processor determines a target voltage of the vehicle charging device based on the estimated coupling coefficient and a predetermined coupling coefficient, and transmits information about the target voltage to the vehicle charging device.

14. A vehicle charging device, comprising:
an input to which an electrical signal is transmitted;
a first voltage converter configured to convert a voltage of the electrical signal according to a vehicle charging mode determined by a plurality of switches;
a magnetic field generator configured to generate a magnetic field corresponding to the voltage converted by the first voltage converter; and
a direction switch configured to switch a direction of a current flowing in a coil of the magnetic field generator so as to form the magnetic field having an intensity corresponding to a magnitude of the converted voltage in the magnetic field generator,
wherein the first voltage converter comprises a cascade buck-boost power factor correction converter.

15. The vehicle charging device of claim 14, further comprising:
at least one communicator configured to receive information about a voltage applied to a battery of a vehicle from the vehicle; and a processor configured to determine a vehicle charging mode based on the information about the voltage.

16. The vehicle charging device of claim 15, wherein
the processor calculates an estimated coupling coefficient using a voltage applied to the battery and a voltage converted by the first voltage converter, and determines the vehicle charging mode based on a difference between the estimated coupling coefficient and an expected coupling coefficient.

17. The vehicle charging device of claim 16, wherein:
the processor determines whether to open or close each of the plurality of switches according to the vehicle charging mode.

18. The vehicle charging device of claim 17, wherein:
the plurality of switches comprises a buck switch and a boost switch, wherein the processor determines to open the buck switch and to close the boost switch among the plurality of switches when it is determined that a voltage stepdown is needed according to a difference between the estimated coupling coefficient and the expected coupling coefficient.

19. The vehicle charging device of claim 17, wherein:
the plurality of switches comprises a buck switch and a boost switch, wherein the processor determines to close the buck switch and the boost switch among the plurality of switches when it is determined that a voltage step-up is needed according to a difference between the estimated coupling coefficient and the expected coupling coefficient.

20. The vehicle charging device of claim 14, further comprising:
a second voltage converter connected to the first voltage converter in parallel with each other and configured to change a voltage of the electrical signal based on a vehicle charging mode that is changed by the plurality of switches.

* * * * *